INVENTOR.
ARTHUR V. NICHOL
BY
Carl H. Symmestvedt
AGENT

INVENTOR.
ARTHUR V. NICHOL
BY
Carl H. Symmestvedt
AGENT

United States Patent Office 3,013,117
Patented Dec. 12, 1961

3,013,117
MOUNTING STRUCTURE
Arthur V. Nichol, Elkins Park, Pa., assignor to Philco Corporation, Philadelphia, Pa., a corporation of Pennsylvania
Filed Nov. 22, 1957, Ser. No. 698,296
3 Claims. (Cl. 178—7.82)

This invention relates generally to an improved method and means for mounting frangible objects, and more particularly to a unique method and apparatus facilitating the accurate and standardized mounting of such objects within enclosures of fixed and determined configuration.

While of broader applicability this invention has especial utility when employed in the mounting of frangible devices, such as the mounting of a non-rectangular cathode ray tube within the box-like confines of a television receiver, and it is in this particular field of application that the concepts of the invention are illustrated and described.

Prior art techniques for installing cathode ray tubes, and other devices of similar nature having a non-uniform, and not precisely predictable configuration, are relatively complex, a typical illustration, for example, being the conventional technique of mounting a cathode ray tube within a television cabinet, the means normally employed comprising a thin ribbon of fabric or metal disposed in close adjacency to the front of the tube and adapted to secure the bell portion of the tube to the base of the enclosing structure to prevent dislocation or jarring of the tube during normal use. Because of the characteristic irregular, non-uniform and non-rectangular configuration of the surface of the bell portion of the tube, the retaining means must necessarily be terminated in some type of adjustable clamping device to permit proper alignment. This technique while generally accepted is both cumbersome and expensive. Moreover the positioning and alignment of cathode ray tubes within a television receiver, using present methods of tube mounting, is a hazardous procedure at best and one which results in considerable tube breakage.

Accordingly it is an object of this invention to provide for simpler and less costly mounting devices of the nature described which both facilitates installation and eliminates the shortcomings of prior art devices.

It is another and more particular object of this invention to provide an improved cabinet and cathode ray tube mounting for television receivers.

It is a requisite to the safe operation of television receivers that there be interposed between the viewer and the cathode tube face a transparent protecting plate, this plate serving, in event of tube implosion, to arrest flying glass. However, dirt and other particulate matter carried into the cavity formed between the tube and protecting plate accumulates on the surfaces of these members necessitating frequent cleaning to prevent obstruction of the television picture.

A presently recognized technique of ameliorating the above problem, while at the same time providing aesthetically acceptable closure of the peripheral spacing between the tube and protecting plate is to seal this space with a rim, or so called mask, of sheet-like matereial held in aligned relation with the peripheral margin of the cathode ray tube face. This technique, however, because of tube surface irregularities does not provide an effective closure.

It is consequently a further feature of this invention to provide mounting structure for use with cathode ray tubes, and the like, which completely seals off the space between the tube and its associated protecting plate preventing the accumulation of dirt in this zone.

Still another object of this invention is to provide a resilient mounting structure capable of absorbing heavy impact loads with low shock transmission and one which additionally serves, when used in a television receiver, as a dust seal and shadow mask for the cathode ray tube.

The above mentioned and other objects contemplated will be more fully understood by reference to the accompanying detailed description and drawing in which:

FIGURE 1 is a fragmentary perspective of a television receiver embodying features of the present invention;

FIGURES 2 and 3 graphically illustrate steps in fabricating one embodiment of the present invention;

Figures 1, 2, 3:
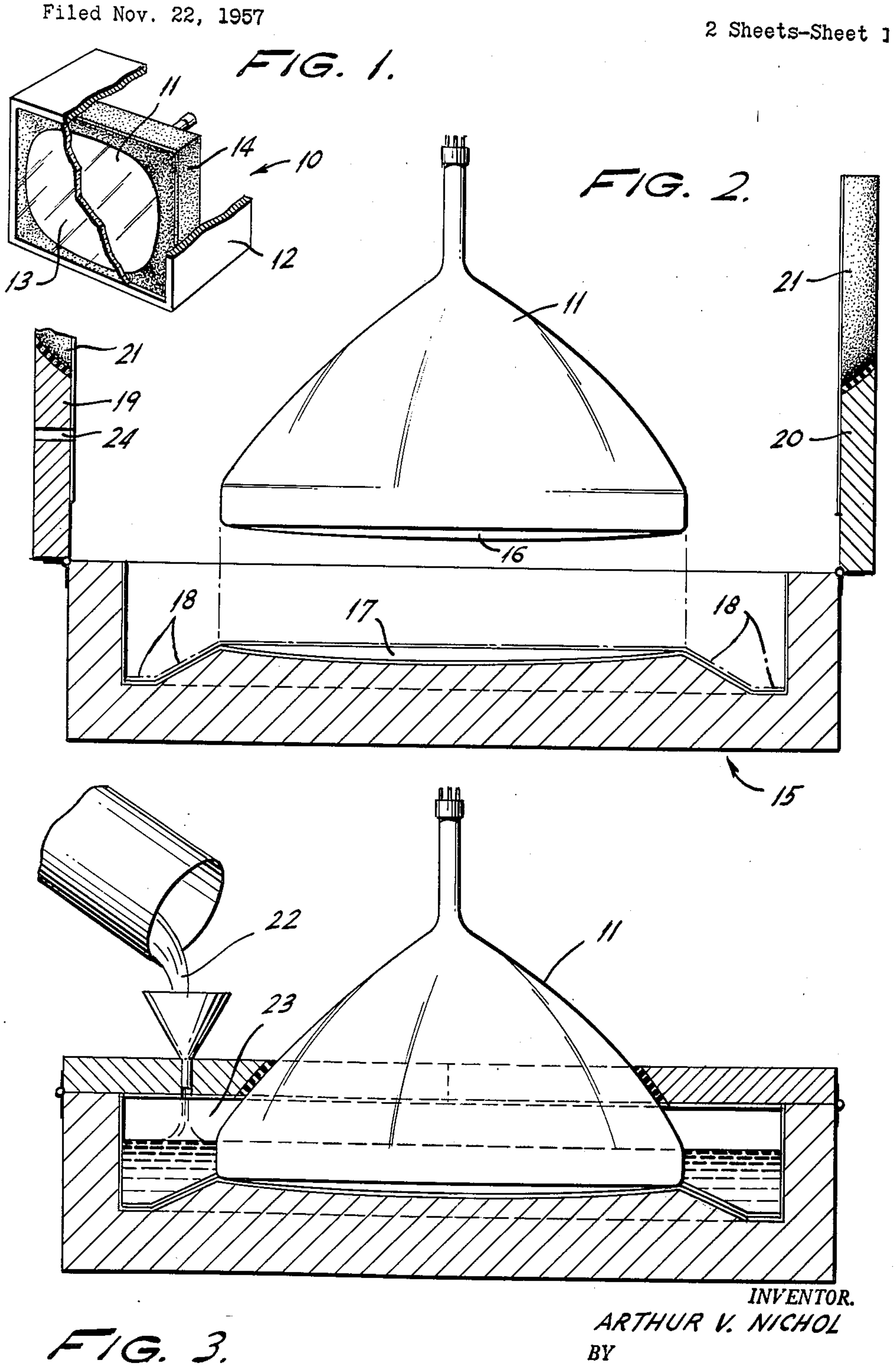

Now making detailed reference to the drawing, FIGURE 1 illustrates a conventional television receiver 10 comprising a cathode ray tube 11, cabinet 12, and protecting plate 13. In particular accordance with the present invention, the tube 11 is supported within the cabinet 12 by means of a resilient foamed plastic casing 14.

This envelope or casing 14, is preferably produced by selectively encapsulating a portion of the cathode ray tube, one technique being that graphically illustrated in FIGURES 2 and 3. The procedure consists of placing the tube 11 within a suitable mold 15, the face of the tube 16 being firmly seated against a mating mold portion 17 in order to prevent contamination of the tube face during subsequent operations. The mold area 18 peripherally bounding the raised portion 17, is conveniently shaped to impart to the contacting surface of the encapsulating or potting media the supporting ring or mask configuration ultimately desired, that is, a configuration which provides proper support for the tube and which is consistent with the shape of the cabinet recess or aperture within which the tube is to be mounted. The technique permits mask designs economically unattainable by other modes of manufacture. Moreover, the surface texture of the mask may be readily controlled by varying the formulation of the chemical constituents comprising the expandable plastic.

Another method advantageously affording control of both the texture and color of the mask surface, and one which permits the employment of an inexpensive low density core, of the type which may have an objectionable surface appearance, is to apply an appropriately pigmented film-producing coating to the mask forming surface of the mold prior to introducing the potting media. The mold, if not made of a non-adhering material, may be pretreated with a commercially available mold release material. This film-producing coating shown in FIGURE 6 at 14*a*, which is non foaming, is desirably of material which will readily bond with the core 14 during the expansion phase to produce a smooth tight covering on the mask forming surfaces of the expanded core. The exothermic reaction which produces the foam plastic, generates sufficient heat to aid in the coalescing of these materials and facilitates the curing and formation of the composite unitary assembly depicted in FIGURE 6. It will be understood that various types of materials can be employed to bring about the desired result, one combination found particularly satisfactory being that of using a film-producing polyurethane coating in conjunction with a core of urethane foam. The versatility and ease of fabrication inherent in this mode of manufacture constitutes one of the salient and unique features of this aspect of the invention.

With the tube properly positioned within the mold, the hinged door-like members 19 and 20 are brought into abutment with the tube in the manner shown in FIGURE 3, the surfaces 21 of these members being preferably lined with a resilient material to prevent fracture of the tube, and to promote an air tight closure with the contacting tube surface.

Next a predetermined charge of expandable material 22 is introduced into the cavity 23, the quantity needed being a function of the density ultimately desired. Preferably, because of its ease of handling and ability to be used without complicated equipment, a reactant type gas expanded foam plastic, such as that obtained by chemical reaction of polyisocyanates and resinous polymers is employed. It is, of course, contemplated that numerous types of expandable foamed plastics may be employed, for example, to mention a few, phenolic, styrene, vinyl, and expandable beads of polystyrene. Moreover, the term "foamed plastic" is not meant to denote a specific material, but is meant to be inclusive of all substances capable of being cellularly expanded, or substances otherwise produced, which result in a product having substantially similar qualities.

As the reactant type gas-expanded foam plastic chosen for illustration adheres to most materials, it is necessary, in the event adhesion is not desired, to treat the surfaces of the material with a lubricant, such as Johnsons Paste Wax or Dow-Corning DC–20 Silicone Resin Release. If on the other hand extreme adhesion characteristics are required a primer or bonding agent such as zinc chromate may be employed. The mold surfaces, in order to facilitate removal of the finished product, are preferably coated with some form of mold release material or, where feasible, the mold may be made of some non-adhering material such as Teflon.

The preferred procedure for partially encapsulating or potting the tube consists of pouring a mixture of two or more reacting liquids into the mold cavity 23, as shown in FIGURE 3, the exact formulation of the reacting chemical constituents being dictated by the requirements of the particular application. In the application illustrated, the reaction resulting from this admixture does not occur until from one to four minutes after mixing, thereby affording ample time to charge the mold cavity 23.

The access hole 24 through which the mixture 22 is poured is left uncapped in order to afford visual indication of completion of the expansion process and to afford an escape port for any untrapped expanding gases. The reaction which takes place comprises copolymerization of resin and isocyanates and a gassing reaction which produces carbon dioxide. Formation of the carbon dioxide expands the reacting mass and, as the resin sets, the gas remains trapped and retained in the multiple cells it has created within the expanded body of the plastic. As indicated above, other materials may be utilized within the broader teaching of this invention.

The particular arrangement shown in FIGURES 2 and 3 results in physical entrapment of the cathode ray tube 11, by the expanding mass of plastic, the plastic casement 14, effectively converting the mounting surfaces of the tube 11, into a uniform package of precisely reproducible size and shape.

Figure 4:
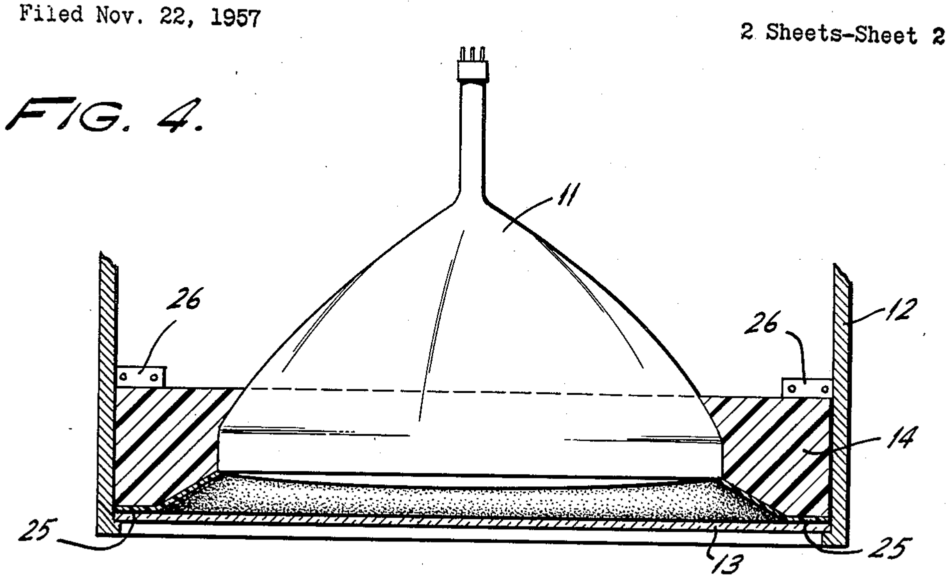
FIGURE 4 is a sectionalized plan view of a cathode ray tube mounted in accordance with the invention.

The steps necessary to mount this converted cathode ray tube 11 in the cabinet 12 (FIGURE 4) consist merely of inserting the composite assembly comprising tube 11, and casement 14, within the television cabinet 12, firmly seating its front surface 25 against the cabinet housing and/or protecting plate 13, and with the assembly thus positioned, securing the unit in place by means of retaining blocks 26.

Figure 6:
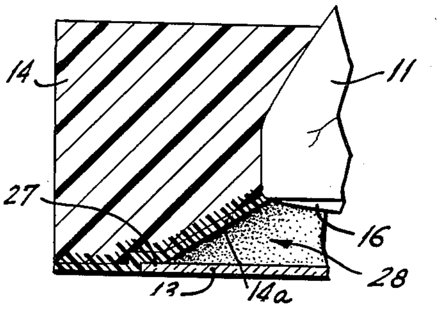
FIGURE 6 is an enlarged fragmentary showing of a still further constructional refinement.

If desired, as shown in FIGURE 6, a recess 27, suitable for housing the protecting plate 13 may conveniently be molded into the support structure 14, thereby insuring hermetic closure of the space between this plate and tube face 16.

Figure 5:
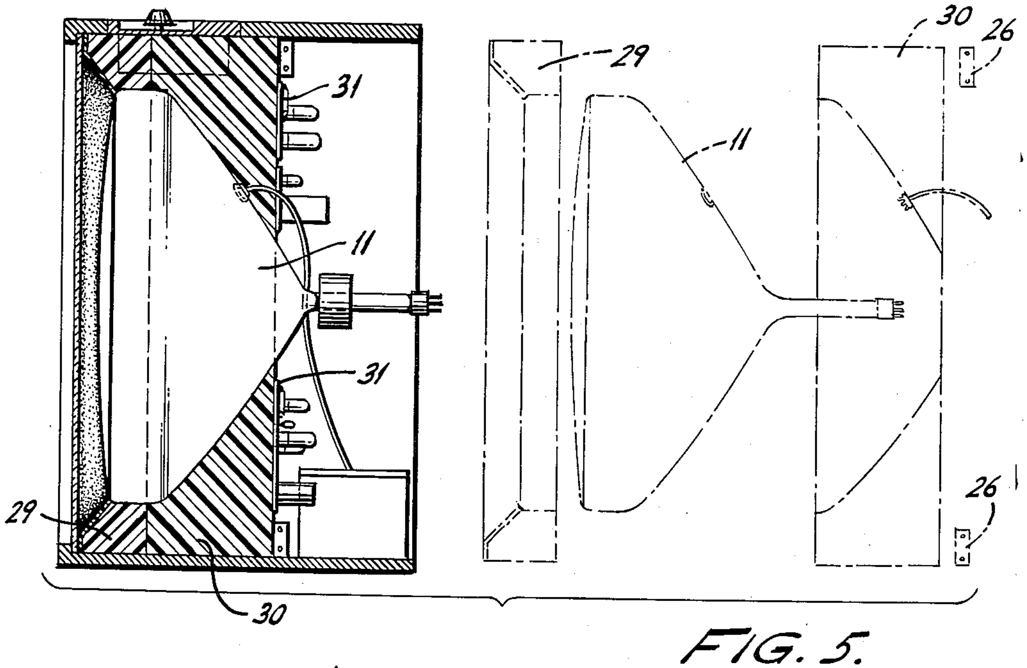
FIGURE 5 shows an alternative arrangement for mounting a cathode ray tube within a television receiver.

Numerous alternative arrangements utilizing the teachings of this invention can be evolved, such as that shown in FIGURE 5. In this figure the support structure is comprised of two molded members 29 and 30 both freely removable from the cathode ray tube and which, when acting conjointly in the manner shown, serve effectively to trap the tube between them and permit the tube to be installed by a procedure equivalent to that already described. The rear support member 30, in addition to its entrapping function, also serves to replace the conventional high voltage anode insulating boot and acts as a vertical chassis on which to mount printed wiring boards 31 and other electrical components. This arrangement is particularly advantageous since the casements 29 and 30 are sufficiently elastic to be used for mounting tubes other than the one for which they were specifically made.

A still further modification which can be utilized where strength requirements permit, and one which utilizes a minimum of material, is simply adhesively to join a narrow rim of expanded plastic, or other similar material, to the outer periphery of the tube, doing away entirely with the need for entrapment as required by the illustrated embodiments.

The continuous contact provided by the mode of support herein described serves to distribute any shock resulting from impact over substantially the entire support area, thereby preventing localization of stress, a factor having particular significance in the mounting and shipment of cathode ray tubes and other frangible devices.

Although only a limited number of embodiments have been shown and described it will be understood by those skilled in the art that the invention is susceptible of changes and modifications without departing from the essential concepts thereof, and that such changes and modifications are contemplated as come within the scope of the appended claims.

I claim:

1. The combination comprising: a television cabinet; a cathode ray tube; a coherent body of shock insulative material; and means whereby said shock insulative material provides the entire support for said tube within said cabinet through interlocking engagement of said material with frontal portions of said tube and cabinet.

2. The combination comprising: a television cabinet; a cathode ray tube; and a coherent body of foamed, cellular, shock insulative material interposed between said enclosure and forward portions of said tube; and means whereby said shock insulative material provides the entire support for said tube within said enclosure.

3. The combination comprising: a television cabinet; a cathode ray tube having forwardly disposed reentrant surface portions; and members of foamed, cellular shock insulative material cooperatively encasing mentioned reentrant portions of said tube and conformed to interior surfaces of said cabinet to facilitate alignment of said tube within said cabinet; and means whereby said shock insulative material provides the entire support for said tube within said cabinet.

References Cited in the file of this patent

UNITED STATES PATENTS

| | | |
|---|---|---|
| 2,627,066 | Blaker et al. | Jan. 27, 1953 |
| 2,757,889 | Cady | Aug. 7, 1956 |

FOREIGN PATENTS

| | | |
|---|---|---|
| 520,412 | Great Britain | Apr. 23, 1940 |
| 938,734 | Germany | Feb. 9, 1956 |